United States Patent [19]

Suzuki et al.

[11] 4,437,309

[45] Mar. 20, 1984

[54] PNEUMATIC-HYDRAULIC SYSTEM FOR HYDRAULIC ACTUATOR

[75] Inventors: Osamu Suzuki, Toyohashi; Kunio Yamaguchi, Okazaki; Meguru Yamamoto, Toyokawa, all of Japan

[73] Assignee: Toyooko Kogyo Kabushiki Kaisha, Japan

[21] Appl. No.: 253,151

[22] Filed: Apr. 10, 1981

[30] Foreign Application Priority Data

Apr. 22, 1980 [JP] Japan ..... 55-53959

[51] Int. Cl.$^3$ ..... B60T 13/00

[52] U.S. Cl. ..... 60/547.1; 60/585; 60/591; 60/593

[58] Field of Search ..... 60/547 R, 591, 593, 60/537, 542, 543, 584, 585

[56] References Cited

U.S. PATENT DOCUMENTS

| | | | |
|---|---|---|---|
| 2,290,537 | 7/1942 | Christensen | 60/593 |
| 3,250,247 | 5/1966 | Beaman | 60/593 |
| 3,407,601 | 10/1968 | Beck | 60/547.1 |
| 3,787,147 | 1/1974 | McClocklin | 60/547.1 |
| 3,839,866 | 10/1974 | Seidel | 60/593 |
| 4,043,533 | 8/1977 | Cowley | 60/547 |
| 4,112,680 | 9/1978 | Grisebach | 60/593 |
| 4,170,876 | 10/1979 | Dits | 60/547 R |
| 4,174,615 | 11/1979 | Kuhn | 60/584 |
| 4,241,581 | 12/1980 | Chace | 60/591 |
| 4,248,268 | 2/1981 | Choate | 60/591 |

FOREIGN PATENT DOCUMENTS

| | | | |
|---|---|---|---|
| 676764 | 7/1979 | U.S.S.R. | 60/593 |

*Primary Examiner*—Abraham Hershkovitz
*Attorney, Agent, or Firm*—Berman, Aisenberg & Platt

[57] ABSTRACT

In a pneumatic-hydraulic system for driving a hydraulic actuator, a single pneumatic-hydraulic converter includes a cylinder casing with inlet and outlet ports and a plunger reciprocably disposed within the casing to form a hydraulic chamber in open communication with the inlet and outlet ports and a pneumatic chamber for connection to a pneumatic pressure source, the hydraulic chamber having a displacement capacity filled with a predetermined amount of hydraulic fluid necessary for producing at least one reciprocating motion of the actuator. The system also includes supply and return passages respectively connected with the outlet and inlet ports, a change-over valve for switching over hydraulic connection of the passages to the actuator, a hydraulic fluid reservoir within the return passage to store the hydraulic fluid discharged from the actuator, the capacity of the reservoir being larger than that of the hydraulic chamber, and a check valve between the inlet port and the reservoir for permitting the flow of fluid from the reservoir into the hydraulic chamber.

4 Claims, 4 Drawing Figures

PNEUMATIC-HYDRAULIC SYSTEM FOR HYDRAULIC ACTUATOR

BACKGROUND OF THE INVENTION

The present invention relates to a pneumatic-hydraulic system for driving a hydraulic actuator under control of hydraulic pressure intermittently converted from pneumatic pressure.

Such a pneumatic-hydraulic system as described above is useful owing to the differing respective characteristics of pneumatic and hydraulic pressure. In conventional pneumatic-hydraulic systems it has, however, been required to provide at least two pneumatic-hydraulic converters for producing reciprocating motion of a hydraulic actuator such as a hydraulically-powered work cylinder. This results in a complicated piping arrangement and a high manufacturing cost for the system.

SUMMARY OF THE INVENTION

It is, therefore, a primary object of the present invention to provide an improved pneumatic-hydraulic system in which a single pneumatic-hydraulic converter acts to produce reciprocating motion of a hydraulic actuator in a simple construction.

According to the present invention there is provided a pneumatic-hydraulic system for driving a hydraulic actuator, which system comprises a single pneumatic-hydraulic converter including a cylinder casing provided with inlet ane outlet ports, and a plunger reciprocably disposed within the casing to subdivide the interior of the casing into a hydraulic chamber in open communication with the inlet and outlet ports and a pneumatic chamber for connection to a pneumatic pressure source, the hydraulic chamber having a displacement capacity for storing a predetermined amount of hydraulic fluid neccessary for producing at least one reciprocating motion of the hydraulic actuator during the forward movement of the plunger into the hydraulic chamber. The system further comprises a supply passage connected with the outlet port for supplying the pressurized hydraulic fluid from the hydraulic chamber to the actuator; a return passage connected with the inlet port for returning the hydraulic fluid discharged from the actuator to the hydraulic chamber; a change-over valve for switching over the hydraulic connections of the supply and return passages to and from the actuator, a hydraulic fluid reservoir disposed within the return passage to store the discharged hydraulic fluid therein, the capacity of the reservoir being substantially the same as or larger than the displacement capacity of the hydraulic chamber; and a check valve disposed within the return passage between the inlet port and the reservoir for permitting the flow of hydraulic fluid from the reservoir into the hydraulic chamber and for interrupting the reverse flow of hydraulic fluid from the hydraulic chamber.

BRIEF DESCRIPTION OF THE DRAWINGS

The above object and other objects, features and attendant advantages of the present invention will be more fully appreciated as the same becomes more clearly understood from the following detailed description of the preferred embodiments, considered in connection with the accompanying drawings, of which.

DESCRIPTION OF THE PREFERRED EMBODIMENTS

Figure 1:
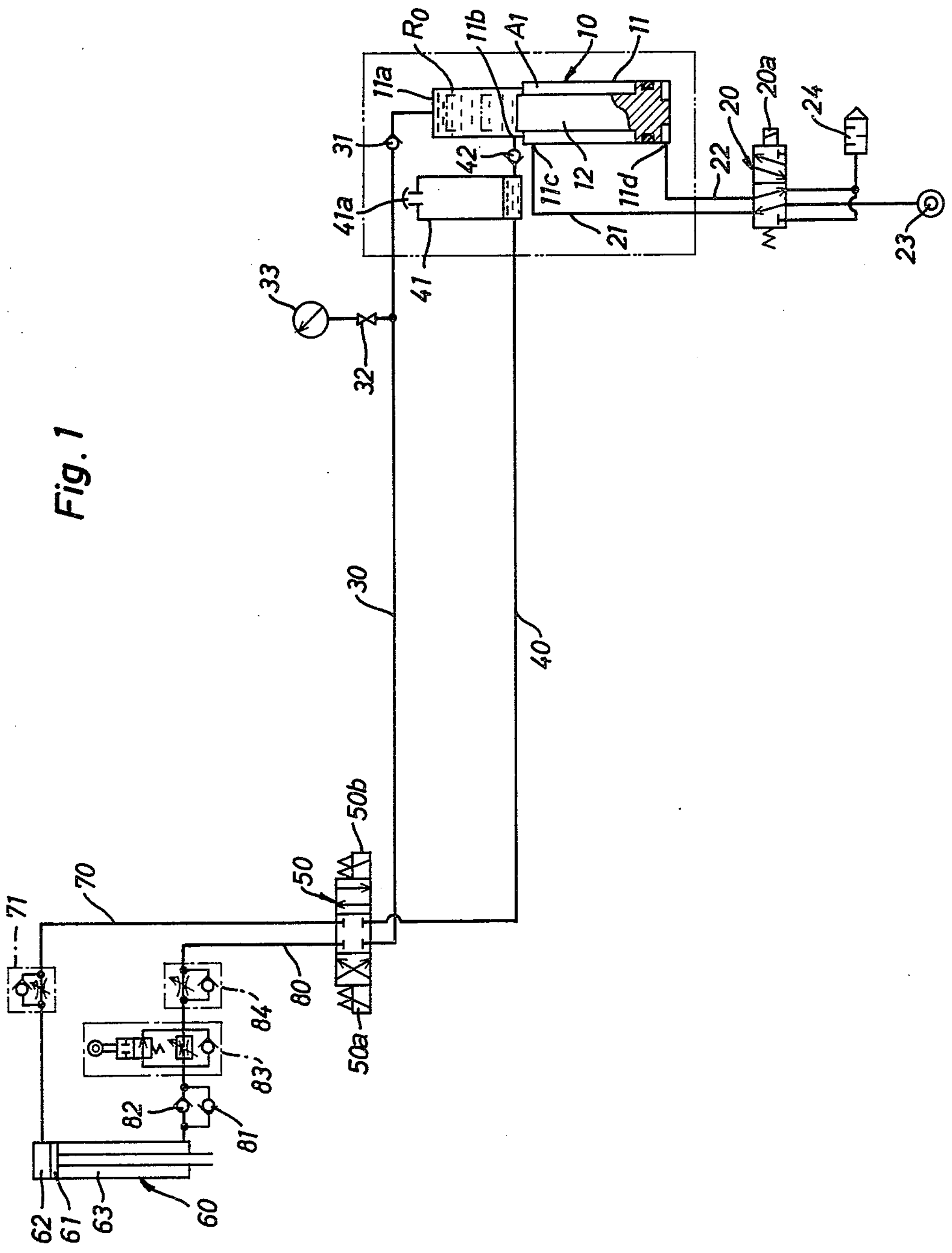
FIG. 1 illustrates a pneumatic-hydraulic circuit diagram in accordance with the present invention.

Referring now to the drawings, in particular to FIG. 1, there is illustrated a fundamental pneumatic-hydraulic circuit diagram in which a single pneumatic-hydraulic converter 10 of the booster type is provided to drive a hydraulic actuator 60 in the form of a hydraulically-powered work cylinder. The pneumatic-hydraulic converter 10 comprises a stepped cylinder casing 11 and a stepped plunger 12 reciprocably disposed within cylinder casing 11 to subdivide the interior of casing 11 into a hydraulic chamber $R_0$, an upper annular pneumatic chamber $A_1$, and a lower pneumatic chamber $A_2$. The cylinder casing 11 is provided at its small-diameter portion with outlet and inlet ports **11*a* and 11*b* which are in open communication with the hydraulic chamber $R_0$ to be filled with hydraulic fluid (usually oil). The cylinder casing 11 is also provided at its large-diameter portion with upper and lower pneumatic ports 11*c* and 11*d*** which are respectively in open communication with the upper and lower pneumatic chmbers $A_1$ and $A_2$.

The upper pneumatic chmber $A_1$ is connected at port **11*c* to a solenoid change-over valve 20 by way of a pneumatic passage 21, whereas the lower pneumatic chamber $A_2$ is connected at port 11*d* to the change-over valve 20 by way of a pneumatic passage 22. The change-over valve 20 is in the form of a two-position valve with a solenoid 20*a*. During deenergization of the solenoid 20*a*, the change-over valve 20 is at its first position, connecting the passage 22 to a silencer 24 exposed to the atmospheric air and connecting the passage 21 to a source of pneumatic pressure 23. Upon energization of solenoid 20*a*, the change-over valve 20 is switched over to its second position to connect the passage 21 to the silencer 24 and to connect the passage 22 to the pneumatic pressure source 23**.

In the pneumatic-hydraulic converter 10, it is noted that the hydraulic chamber $R_0$ has a displacement capacity for storing a predetermined amount of hydraulic fluid necessary for producing one reciprocating motion of the hydraulic actuator 60. The hydraulic chamber $R_0$ is connected at its outlet port **11*a* to a solenoid change-over valve 50 by way of a fluid supply passage 30 and is also connected at its inlet port 11*b* to the change-over valve 50 by way of a fluid return passage 40. The fluid supply passage 30 is provided therein with a check valve 31 permitting the delivery flow of hydraulic fluid from hydraulic chamber $R_0$, and a hydraulic pressure gauge 33 is connected to the supply passage 30 through a stop valve 32. Disposed within the return passage 40 are a hydraulic fluid reservoir 41 of which the capacity is substantially the same as that of the hydraulic chamber $R_0$, and a check valve 42 which is provided to permit the flow of hydraulic fluid into the hydraulic chamber $R_0$ from the reservoir 41** and to interrupt the reverse flow of hydraulic fluid from the hydraulic chamber $R_0$.

In addition, the reservoir 41 is provided thereon with a fluid supply opening 41a with an air breather. In the actual practice of the present invention the capacity of reservoir 41 may be larger than that of the hydraulic chamber $R_0$.

The change-over valve 50 is in the form of a three position valve which is provided with a pair of solenoids 50a and 50b. During deenergization of both the solenoids 50a, 50b, the change-over valve 50 is in its first position, disconnecting the supply passage 30 from a fluid passage 70 which is connected to an upper chamber 62 of hydraulic actuator 60 and also disconnecting the return passage 40 from a fluid passage 80 which is connected to a lower chamber 63 of actuator 60. Upon energization of the solenoid 50a, the change-over valve 50 is switched over to its second position to connect the supply passage 30 to the passage 70 and to connect the return passage 40 to the passage 80. When the solenoid 50a is deenergized and the solenoid 50b is energized, the change-over valve 50 is switched over to its third position to connect the supply passage 30 to the passage 80 and to connect the return passage 40 to the passage 70. In addition, the passage 70 includes therein a speed controller 71 in the form of a flow quantity control valve with a check valve, and the passage 80 includes therein check valves 81, 82, a speed controller 83 with a normally open deceleration valve, and a speed controller 84.

Hereinafter, the mode of operation of the pneumatic-hydraulic system will be described in detail. When the change-over valve 20 is switched over to its second position upon energization of its solenoid 20a, the compressed air from the pneumatic pressure source 23 flows into the lower chamber $A_2$ of converter 10 through passage 22 and port 11d, while the air from the upper chamber $A_1$ is evacuated to the atmosphere through port 11c, passage 21 and silencer 24. This results in an upward or forward movement of the plunger 12 into the hydraulic chamber $R_0$ of converter 10. In this operation, the pneumatic pressure acting on the hydraulic fluid in chamber $R_0$ increases due to the difference in pressure-receiving area between the larger and smaller ends of plunger 12. Subsequently, when the change-over valve 50 is switched over to its second position upon energization of its left-hand solenoid 50a, the supply passage 30 is connected to the passage 70 to supply the pressurized hydraulic fluid from the hydraulic chamber $R_0$ into the upper chamber 62 of actuator 60, while the return passage 40 is connected to the passage 80 to permit the hydraulic fluid discharged from the lower chamber 63 of actuator 60 to flow into the reservoir 41. This results in a downward movement of the piston 61 in actuator 60.

During the downward movement of piston 61, the check valve 42 acts to interrupt the reverse flow of pressurized hydraulic fluid into reservoir 41 from hydraulic chamber $R_0$, while the return flow of hydraulic fluid from actuator 60 is controlled by speed controllers 83, 84 to regulate the downward movement of piston 61. The operation will continue until the upper end of plunger 12 reaches a first upward position indicated by a dot-and-dash line in the figure. Upon arrival of the plunger 12 at its first upward position, the piston 61 in actuator 60 is arrested at its lowermost position, while the plunger 12 in converter 10 is arrested at its first upward position.

Subsequently, the left-hand solenoid 50a is deenergized, and the right-hand solenoid 50b is energized to switch over the change-over valve 50 to its third position. As a result, the supply passage 30 is connected to the passage 80 to allow a further upward movement of plunger 12 into the hydraulic chamber $R_0$ due to the pneumatic pressure acting thereon in the lower chamber $A_2$, while the return passage 40 is connected to the passage 70 to permit the hydraulic fluid discharged from the upper chamber 62 of actuator 60 to flow into the reservoir 41. This results in an upward movement of the piston 61 in actuator 60 caused by the flow of the pressurized fluid from the hydraulic chamber $R_0$ into the lower chamber 63 of actuator 60. During the upward movement of piston 61, the check valve 42 acts to interrupt the reverse flow of pressurized hydraulic fluid into reservoir 41 from hydraulic chamber $R_0$, while the return flow of hydraulic fluid from actuator 60 is controlled by speed controller 71 to regulate the upward movement of piston 61. The operation will continue until the upper end of plunger 12 reaches a second upward position indicated by a two-dots-and-one-dash line in the figure. Upon arrival of the plunger 12 at its second upward position, the piston 61 in actuator 60 is arrested at its uppermost position, while the plunger 12 in converter 10 is arrested at its second upward position.

Thereafter, the change-over valve 50 is returned to its first position upon deenergization of its solenoid 50b, disconnecting the supply and return passages 30 and 40 from the passages 70 and 80 respectively, while the changeover valve 20 is returned to its first position upon deenergization of its solenoid 20a, supplying compressed air from pneumatic pressure source 23 into the upper chamber $A_1$ via passage 21 and permitting the evacuation of the air from the lower chamber $A_2$ via passage 22 and silencer 24. Thus, the plunger 12 in converter 10 is moved to its lowermost position due to the compressed air acting thereon in the upper chamber $A_1$, and simultaneously the stored hydraulic fluid in reservoir 41 is sucked into the hydraulic chamber $R_0$ through check valve 42 so that the converter 10 is returned to its original condition.

From the above detailed description, it will be noted that the upward movement of plunger 12 into the hydraulic chamber $R_0$ causes one reciprocating motion of the piston 61 in actuator 60. This means that the hydraulic actuator 60 is driven by the single pneumatic-hydraulic converter 10 in a simple construction without the provision of two conventional converters. In the actual practice of the present invention, the reduction in the number of the pneumatic-hydraulic converters serves to reduce exhaust noises caused by the air evacuated from the respective pneumatic chambers $A_1$ and $A_2$ of converter 10 so as to provide the operator with more pleasant surroundings. In the case that the respective capacities of the hydraulic chamber $R_0$ and the reservoir 41 are substantially doubled in relation to the capacity of actuator 60, the upward or forward movement of plunger 12 into the hydraulic chamber $R_0$ will cause two reciprocating motions of the piston 61 in actuator 60 or one reciprocating motion of a piston in each of the two hydraulic actuators 60 and 160, as illustrated in FIG. 2.

Figure 2:
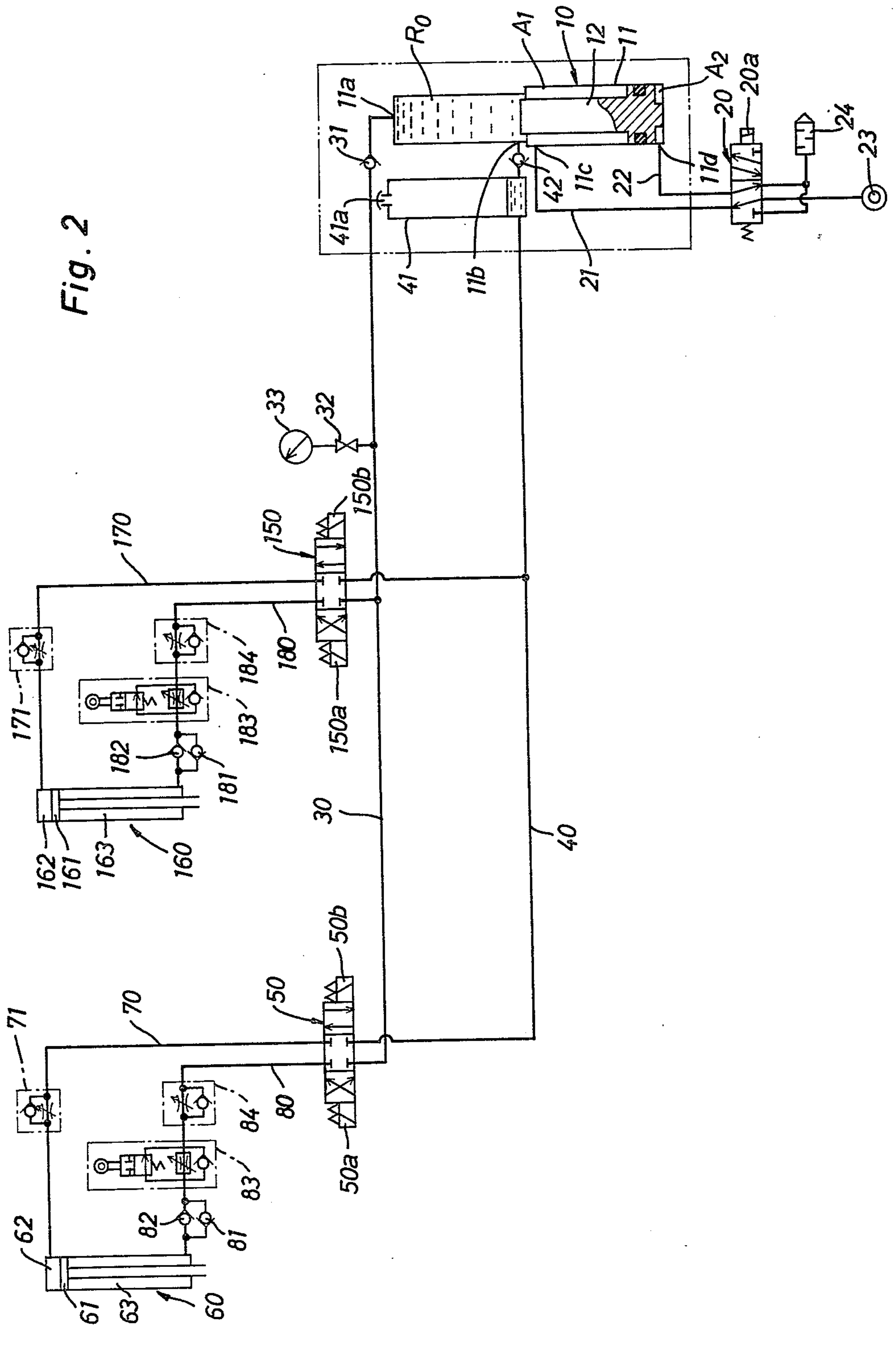
FIG. 2 illustrates a modification of the circuit diagram shown in FIG. 1.

In the pneumatic-hydraulic circuit diagram of FIG. 2, another hydraulic circuit identical to that including the change-over valve 50 and the hydraulic actuator 60 is connected with the supply and return passages 30 and 40; in which circuit the reference numerals prefixed by 100 indicate respective parts corresponding to those of the hydraulic circuit in FIG. 1. With this arrangement, the energization-timing of solenoids 50*a*, 50*b*, 150*a* and 150*b* of the respective change-over valves 50 and 150 may be appropriately determined in relation to that of solenoid 20*a* of the change-over valve 20 to activate the hydraulic actuators 60 and 160 either at the same time or at different times.

Figure 3:
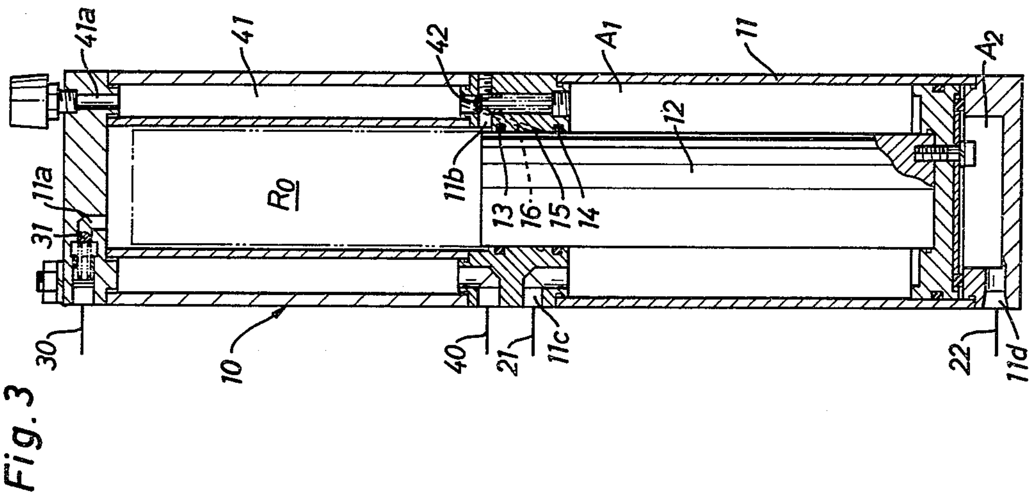
FIG. 3 is a sectional view of a pneumatic-hydraulic converter including the component parts shown in FIG. 1.

Furthermore, in the case that the component parts enclosed by an imaginary line in FIGS. 1 and 2 are integrally constructed as shown in FIG. 3, it is feasible to simplify the piping work for the pneumatic-hydraulic circuit and to reduce the floorage occupied by the component parts. In FIG. 3, the same reference numerals indicate the same component parts as those in FIG. 1. In the construction of FIG. 3, the upper pneumatic chamber $A_1$ is isolated from the hydraulic chamber $R_0$ by means of a pair of O-rings 13 and 14 between which an annular groove 15 communicates with the interior of reservoir 41 through a slant passage 16. In operation, if the compressed air from pneumatic chamber $A_1$ passes through O-ring 14, the groove 15 will allow the flow of compressed air into the reservoir 14 through passage 16. Subsequently, the compressed air will be exhausted to the atmosphere through the upper opening 41*a* and the air breather. This serves to prevent entry of the compressed air into the hydraulic chamber $R_0$ so as to avoid various inconveniences caused by the entry of air into the hydraulic fluid. Even if some hydraulic fluid from chamber $R_0$ leaks through O-ring 13, the groove 15 will direct the flow of said leaked fluid into the reservoir 41 through passage 16 to prevent entry of the leaked fluid into the pneumatic chamber $A_1$.

Figure 4:
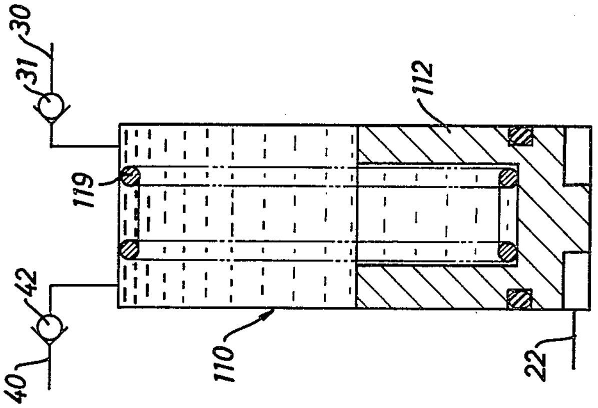
FIG. 4 is a sectional view of another type of pneumatic-hydraulic converter which may be adapted to the circuit diagram of FIG. 1.

In the actual practice of the present invention, the pneumatic-hydraulic converter 10 of the booster type may be replaced with a pneumatic-hydraulic converter 110 of the type shown in FIG. 4 to intermittently convert compressed-air pressure into hydraulic pressure. In operation of the converter 110, it is noted that a piston 112 is moved upwards by the compressed air supplied through passage 22 and moved downwards by the biasing force of a compression spring 119. Alternatively, the change-over valves 50 and 150 may be replaced with first and second two-position valves which are provided to selectively connect and disconnect the supply and return passages 30 and 40 to and from the passages 70, 170 and 80, 180.

Although certain specific embodiments of the present invention have been shown and described, it is obvious that many modifications thereof are possible. The invention, therefore, is not intended to be restricted to the exact form depicted in the drawings and descriptions thereof, but is considered to include reasonable and obvious equivalents.

What is claimed is:

1. A pneumatic-hydraulic system for driving a hydraulic actuator under control of hydraulic pressure converted from pneumatic pressure, said system comprising:

a single pneumatic-hydraulic converter which includes a cylinder casing provided with inlet and outlet ports, and a plunger reciprocably disposed within said casing to subdivide the interior of said casing into a hydraulic chamber in open communication with said inlet and outlet ports and a pneumatic chamber for connection to a pneumatic pressure source, said hydraulic chamber having a displacement capacity for storing a predetermined amount of hydraulic fluid necessary for producing at least one reciprocating motion of said hydraulic actuator during forward movement of said plunger into said hydraulic chamber;

a supply passage connected with said outlet port for supplying the pressurized hydraulic fluid from said hydraulic chamber to said actuator, and a return passage connected with said inlet port for returning the hydraulic fluid discharged from said actuator to said hydraulic chamber;

first change-over valve means arranged in its first position to connect said pneumatic chamber to the pneumatic pressure source for effecting the forward movement of said plunger and arranged in its second position to connect said pneumatic chamber to atmospheric pressure for effecting backward movement of said plunger;

second change-over valve means for switching over the hydraulic connections of said supply and return passages to and from said actuator when said first change-over valve means is maintained in its first position;

a hydraulic fluid reservoir disposed at its lower portion within said return passage to store the discharged hydraulic fluid therein and being provided at its upper portion with an air breather, the capacity of said reservoir being substantially the same as or larger than the displacement capacity of said hydraulic chamber; and check valve means disposed within said return passage between said inlet port and said reservoir for permitting the flow of hydraulic fluid from said reservoir into said hydraulic chamber and for interrupting the reverse flow of hydraulic fluid from said hydraulic chamber.

2. A pneumatic-hydraulic system as claimed in claim 1, wherein said pneumatic-hydraulic converter includes:

a stepped cylinder casing having small and large diameter portions, said casing being provided at the small diameter portion thereof with inlet and outlet ports for connection to said return and supply passages respectively and at the large diameter portion thereof with first and second pneumatic ports arranged to be selectively connected to a pneumatic pressure source and atmospheric pressure;

a stepped plunger reciprocably disposed within said casing to subdivide the interior of said casing into a hydraulic chamber in open communication with said inlet and outlet ports, and first and second pneumatic chambers in open communication with said first and second pneumatic ports respectively, said hydraulic chamber having a displacement capacity for storing a predetermined amount of hydraulic fluid necessary for producing at least one reciprocating motion of said hydraulic actuator during forward movement of said stepped plunger into said hydraulic chamber, and wherein said first change-over valve means is arranged in its first position to connect said first and second pneumatic ports respectively to the pneumatic pressure source and atmospheric pressure for effecting the forward movement of said plunger and arranged in its second position to connect said first and second pneumatic ports respectively to atmospheric pressure and the pneumatic pressure source for effecting backward movement of said plunger.

3. A pneumatic-hydraulic system as claimed in claim 2, wherein said hydraulic fluid reservoir is in the form of an annular fluid reservoir in surrounding relationship with the small diameter portion of said stepped cylinder casing, said annular fluid reservoir communicating at its lower portion with said hydraulic chamber through said check valve means and having an air breather at its upper portion.

4. A pneumatic-hydraulic system as claimed in claim 1, wherein said pneumatic-hydraulic converter includes:

a cylinder casing provided at one end thereof with inlet and outlet ports for connection to said return and supply passages respectively and at the other end thereof with a pneumatic port for connection to a pneumatic pressure source;

a piston reciprocably disposed within said casing to subdivide the interior of said casing into a hydraulic chamber in open communication with said inlet and outlet ports and a pneumatic chamber in open communication with said pneumatic port, said hydraulic chamber having a displacement capacity for storing a predetermined amount of hydraulic fluid necessary for producing at least one reciprocating motion of said hydraulic actuator during the forward movement of said piston toward said hydraulic chamber; and means for biasing said piston toward said pneumatic chamber.

* * * * *